(12) United States Patent
Ferguson et al.

(10) Patent No.: US 7,468,977 B1
(45) Date of Patent: Dec. 23, 2008

(54) LAN/ATM SWITCH HAVING LOCAL PACKET SWITCHING AND AN ATM CORE FABRIC

(75) Inventors: H. Earl Ferguson, Los Alto, CA (US); Bobby R. Johnson, Jr., San Jose, CA (US); Mike Noll, San Jose, CA (US); Jeff Prince, Sunnyvale, CA (US); Randy Ryals, Menlo Park, CA (US)

(73) Assignee: Nortel Networks Limited, St. Laurent (CA)

( * ) Notice: Subject to any disclaimer, the term of this patent is extended or adjusted under 35 U.S.C. 154(b) by 549 days.

(21) Appl. No.: 10/298,137

(22) Filed: Nov. 18, 2002

Related U.S. Application Data (63) Continuation of application No. 08/795,240, filed on Feb. 10, 1997, now abandoned, which is a continuation of application No. 08/501,537, filed on Jul. 12, 1995, now abandoned.

(51) Int. Cl.
H04L 12/28 (2006.01)
(52) U.S. Cl. .................. 370/392; 370/390; 370/395.54; 370/419
(58) Field of Classification Search ........................ None
See application file for complete search history.

(56) References Cited

U.S. PATENT DOCUMENTS

| | | | |
|---|---|---|---|
| 4,975,695 A | 12/1990 | Almond et al. | |
| 5,130,984 A | 7/1992 | Cisneros | |
| 5,195,181 A | 3/1993 | Bryant et al. | |
| 5,214,760 A | 5/1993 | Hammond et al. | |
| 5,280,476 A * | 1/1994 | Kojima et al. | 370/397 |
| 5,315,588 A * | 5/1994 | Kajiwara et al. | 370/389 |
| 5,321,691 A | 6/1994 | Pashan | |
| 5,367,520 A | 11/1994 | Cordell | |
| 5,386,413 A | 1/1995 | McAuley et al. | |
| 5,386,416 A | 1/1995 | Neth | |
| 5,394,402 A | 2/1995 | Ross | |
| 5,398,245 A | 3/1995 | Harriman, Jr. | |
| 5,408,469 A * | 4/1995 | Opher et al. | 370/399 |
| 5,420,858 A | 5/1995 | Marshall et al. | |
| 5,453,980 A | 9/1995 | Van Engelshoven | |
| 5,471,472 A | 11/1995 | McClure et al. | |
| 5,483,640 A | 1/1996 | Isfeld et al. | |
| 5,485,455 A | 1/1996 | Dobbins et al. | |
| 5,502,719 A | 3/1996 | Grant et al. | |

(Continued)

OTHER PUBLICATIONS

Dryan, D. and Ellis J., "A New Class of Switch for the Multimedia Age", UMI, Inc., ABI?INFORM, Bell Northern Research Ltd., vol. 28, No. 6, pp. 52-67, ISSN:0040-2710, May 1994.

(Continued)

*Primary Examiner*—Andrew Lee
(74) *Attorney, Agent, or Firm*—Blakely, Sokoloff, Taylor & Zafman (57) ABSTRACT

A device for switching data packets providing for local packet switching and non-local ATM switching. The device provides a packet switch coupled with LAN ports and provides for local switching between the LAN ports over the packet switch. Packets not known to be destined for data terminal equipment coupled with one of the ports are segmented and switched over an ATM backplane, switch or network.

35 Claims, 6 Drawing Sheets

U.S. PATENT DOCUMENTS

| | | | |
|---|---|---|---|
| 5,524,113 A | | 6/1996 | Gaddis |
| 5,528,590 A | | 6/1996 | Iidaka et al. |
| 5,537,395 A | | 7/1996 | Alles et al. |
| 5,555,244 A | | 9/1996 | Gupta et al. |
| 5,570,348 A | | 10/1996 | Holden |
| 5,579,480 A | * | 11/1996 | Cidon et al. ............... 709/243 |
| 5,588,115 A | | 12/1996 | Augarten |
| 5,592,622 A | | 1/1997 | Isfeld et al. |
| 5,594,734 A | | 1/1997 | Worsley et al. |
| 5,600,644 A | * | 2/1997 | Chang et al. ............... 370/404 |
| 5,602,844 A | | 2/1997 | Lyles |
| 5,633,869 A | * | 5/1997 | Burnett et al. ............. 370/396 |
| 5,732,080 A | | 3/1998 | Ferguson et al. |
| 5,734,656 A | | 3/1998 | Prince et al. |
| 5,737,334 A | | 4/1998 | Prince et al. |
| 5,802,278 A | | 9/1998 | Isfeld et al. |
| 5,809,024 A | | 9/1998 | Ferguson et al. |
| 5,852,606 A | * | 12/1998 | Prince et al. .......... 370/395.53 |
| 5,889,775 A | | 3/1999 | Sawicz et al. |
| 5,987,008 A | | 11/1999 | Simpson et al. |
| 6,216,167 B1 | | 4/2001 | Momirov |
| 6,370,142 B1 | * | 4/2002 | Pitcher et al. ............... 370/390 |
| 6,427,185 B1 | | 7/2002 | Ryals et al. |
| 6,788,671 B2 | | 9/2004 | Ryals et al. |

OTHER PUBLICATIONS

Tannenbaum, A., "Structured Computer Oragnization," Third Edition, Prentice Hall, Englewood Cliffs, NJ, ISBN 0-13-85466202, pp. 209-215, 1990.

Biagioni, Edoardo, et al., "Designing a Practicle ATM LAN," IEEE Network, vol. 7, No. 2, Mar. 3, 1993.

Henrion, M.A., et al., "Switching Network Architecture for ATM Based Broadband Communications", vol. V, 1-8, ISS May 27, - Jun. 1, 1990.

Souza, Robert J. et al., "GIGAswitch System: A High-Performance Packet-Switching Platform", Digital Technical Journal, vol. 6, No. 1, 1994.

McAuley, Anthony J., et al., "Fast Routing Table Lookup Using CAMs" IEEE Computer Society Press, vl. 3, Los Alamitos, 1993.

Bryant, Stewart F. and Brash, David L.A., "The DECNIS 500/600 Multiprotocol Bridge/Router and Gateway," Digital Technical Journal, vol. 5, No. 1, pp. 84-98, Winter 1993.

DePrycker, Martin, "Asynchronous Transfer Mode: Solution for Broadband ISDN", pp. 55-89, Ellis Horwood Limited, West Sussec, England, 1991.

McKeown, Nick; Edell, Richard and Le, My T., "The Bay Bridge: A High Speed Bridge/Router", IFIP PfHSN Workshop, Stockholm, Sweden, pp. 1-18, May 1992.

Jaffe, J.M.; Moss, F.H. and Weingarten, R.A., "SNA Routing: Past, Present and Possible Future", IBM Systems Journal, vol. 22, No. 4, pp. 417 434, 1983.

\* cited by examiner

LAN/ATM SWITCH HAVING LOCAL PACKET SWITCHING AND AN ATM CORE FABRIC

CROSS-REFERENCES TO RELATED APPLICATIONS

This is a continuation of U.S. application Ser. No. 08/795,240 filed Feb. 10, 1997, now abandoned, which is a continuation of U.S. application Ser. No. 08/501,537 filed Jul. 12, 1995, now abandoned.

BACKGROUND OF THE INVENTION

1. Field of the Invention

The present invention relates to the field of computer networking, specifically to the field of local area network communications. More specifically, the present invention relates to methods and apparatus providing for switching of packets locally when the packets are provided from a local source device and destined for a local destination device and providing for asynchronous transfer mode (ATM) switching when packets are provided from a local source device and destined for a remote destination device.

2. Description of the Related Art

U.S. Pat. No. 5,408,469 (the '469 patent) titled "Roping Device Utilizing an ATM switch as a multi-channel backplane in a Communication Network" (which patent is assigned to the assignee of the present invention) describes a device for switching packets received from a local area network segment though an ATM switch to another local area network segment. The '469 patent is incorporated herein by reference. In the background section of the '469 patent there is basic teaching of ATM networks, ATM cell formats, ATM switching and network concentrators and that information is not repeated here. Rather, reference is simply made to the '469 patent.

U.S. Pat. No. 5,420,858 (the '858 patent) titled "Method and Apparatus for communication from a non-ATM communication medium to an ATM communication medium" (which patent is assigned to the assignee of the present invention) describes a device for switching packets received from a local area network segment onto an ATM network. The '858 patent is incorporated herein by reference. In the background section of the '858 patent, there is also disclosure of basic information regarding ATM networks.

In the '469 patent, it is taught that a packet may be received from one local area network (LAN) segment by the central device 200 on a port such as port 211A. The packet is then segmented and ATM cells are formed and provided to the ATM switch. The cells are then switched or routed by the ATM switch, reassembled into a packet and are provided out over another port onto another LAN segment.

While the '469 patent effectively provides for switching of packets over an ATM switch (after segmentation), it does so by segmenting all packets received and then switching the resulting cells over the ATM backplane. This architecture makes it necessary to convert or segment all packets into cells, and to use bandwidth on the ATM backplane for all packets.

The '858 patent, similar to the '469 patent teaches a device in which all packets are segmented and then switched over an ATM network.

What is desired is a system that provides for local switching of packets which are received on a local LAN segment and which are destined for a local LAN segment avoiding the overhead associated with segmentation of all packets.

It is worthwhile mentioning that the local LAN segments may be, for example, token ring, FDDI, Ethernet or other carrier sense multiple access (CSMA) or other local area network protocols. As these protocols are well-known, they will not be described here in detail.

SUMMARY OF THE INVENTION

A device for use in a data transmission network is described which provides for local switching of data packets between interfaces of a module over a data packet switch; which provides for switching of packets between modules in a system chassis over an ATM backplane; and which provides for switching of data packets not known to be addressed to a local data terminal equipment over standard ATM network.

The device comprises first and second ports coupled with respective first and second local area networks segments, a packet switch, a segmentation circuit, and an ATM interface. The packet switch is coupled to the first and second port for switching information packets received from data terminal equipment on the first local area network segment and destined for a DTE on the second local area network segment (i.e., switching between devices attached to ports on the same module). If the destination DTE is not known to be attached to a port on the same module, the segmentation circuit segments the packet into cells and transmits the cells over an ATM network. In the case of a packet destined for a device coupled with a port on another module in the same switching device, the cells are transmitted over an ATM backplane of the switch device. In the case of packets destined for DTEs attached to other switch devices, the cells are transmitted over an ATM cloud.

The present invention further provides for discrimination of packets based on destination addresses at the port level of the switch device avoiding the need to transmit packets destined for DTEs on attached to the same port to the packet switch for processing.

These and other aspects of the present invention will be discussed in greater detail with reference to the detailed description and the accompanying figures.

BRIEF DESCRIPTION OF THE DRAWINGS

FIG. 2(*a*) is an illustration of a first mode of operation of a device as may be utilized by the present invention.

FIG. 2(*b*) is an illustration of a second mode of operation of a device as may be utilized by the present invention.

For ease of reference, it might be pointed out that reference numerals in all of the accompanying drawings typically are in the form "drawing number" followed by two digits, xx; for example, reference numerals on FIG. 1 may be numbered 1*xx*; on FIG. 3, reference numerals may be numbered 3*xx*. In certain cases, a reference numeral may be introduced on one drawing and the same reference numeral may be utilized on other drawings to refer to the same item.

DETAILED DESCRIPTION OF THE PREFERRED EMBODIMENT

What is described herein is a local area network switching device utilizing both packet switching and Asynchronous Transfer Mode (ATM) switching. In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

Figure 1:
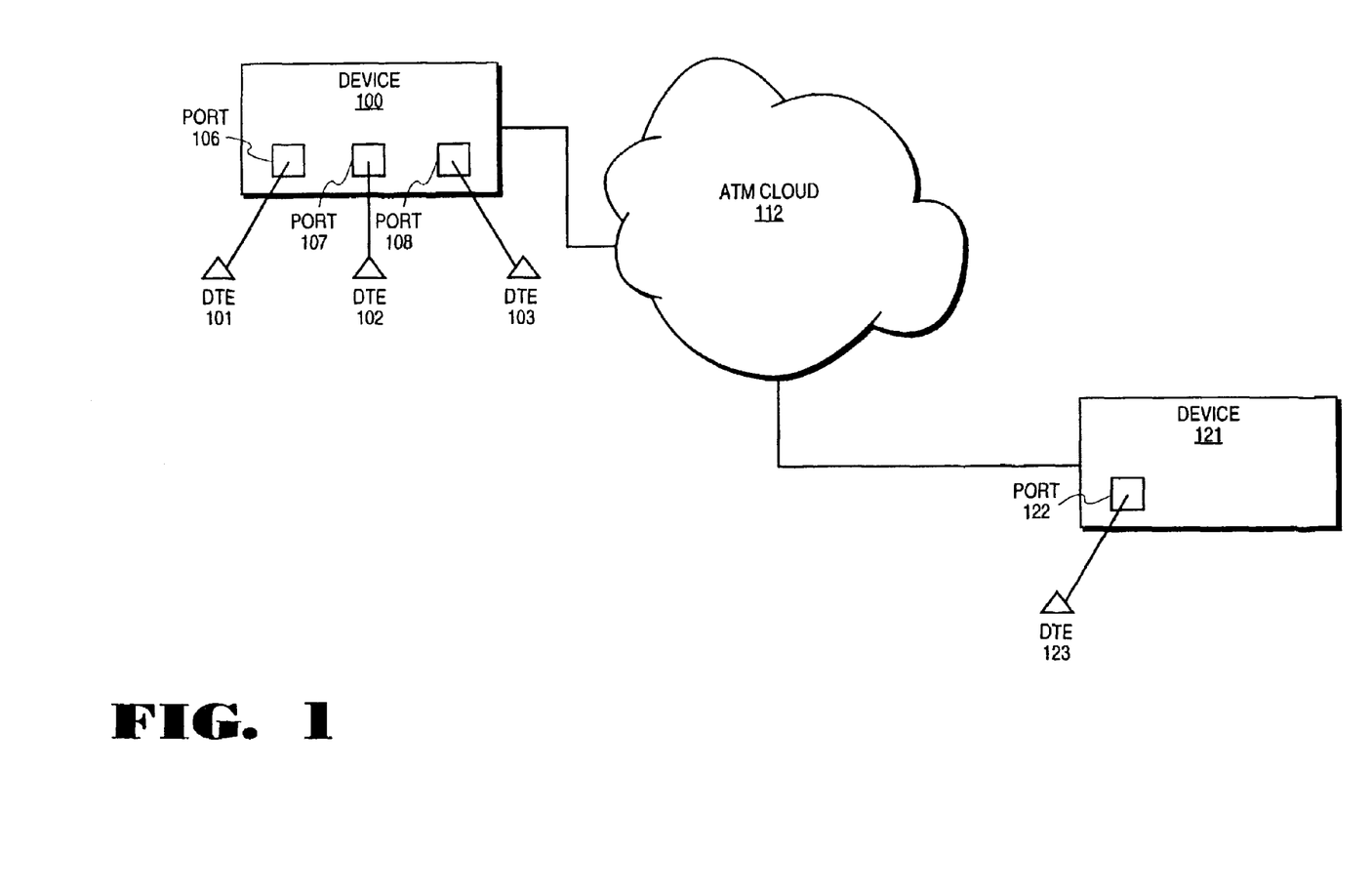
FIG. 1 is an illustration of a network as may utilize the present invention.

Overview of a Communications Network Such as May Utilize the Present Invention FIG. 1 illustrates generally a network such as may implement the present invention. A first device 100 and a second device 121 may be coupled in communication through an ATM cloud 112 allowing for communication of cells between the two devices 100 and 121 through the cloud 112. In the described embodiment of the present invention, the first device and second device may be ATM-core LAN switches which are described in greater detail with reference to FIGS. 2(a), 3 and 4. The device 100 includes a plurality of ports 106, 107 and 108. It will be apparent that the device 100 may include a greater (or lesser) number of ports without departure from the spirit and scope of the present invention.

In certain embodiments, the device 100 may be implemented with a chassis having a communication backplane (such as an ATM backplane) which supports interconnection of a plurality of interconnecting modules. The modules may support any of, for example, token ring, FDDI, Ethernet, and ATM network segments. In one embodiment, a chassis is provided that provides six slots and, therefore, supports six modules.

Data terminal equipment (DTE) 101-103 (such as a computer, file server, printer, etc.) may be coupled through each of the ports 106-108. It is noted that embodiments of the invention may utilize shared segments allowing for multiple devices to be coupled through any individual port 106-108. However, for sake of simplicity of the drawing, only a single device is illustrated per port. In addition, device 121 may also include a plurality of ports supporting a plurality of devices although, again for sake of simplicity of the drawing, only port 122 and DTE 123 are illustrated.

Description of the ATM-Core LAN Switch

Figure 2A:
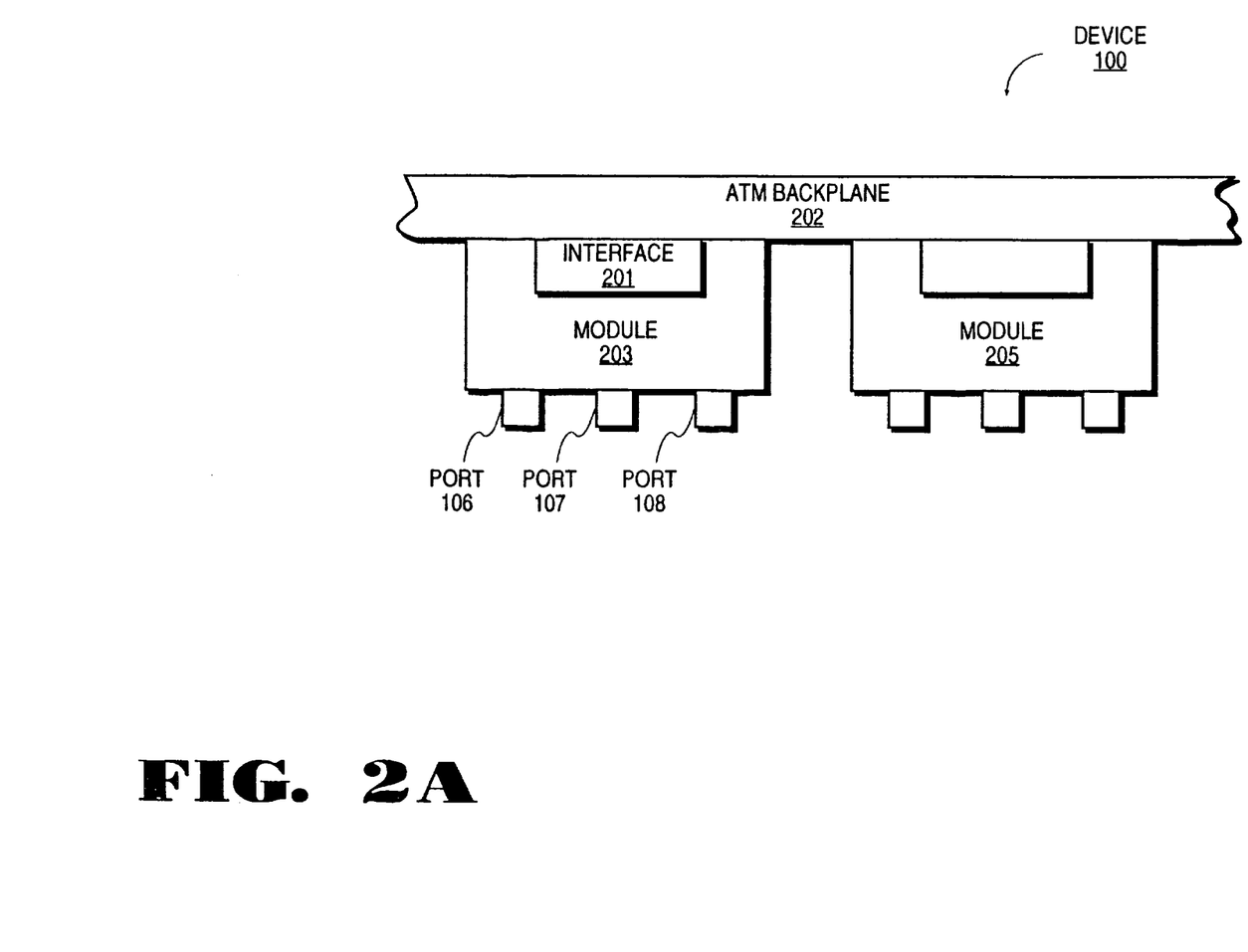
Figure 2B:
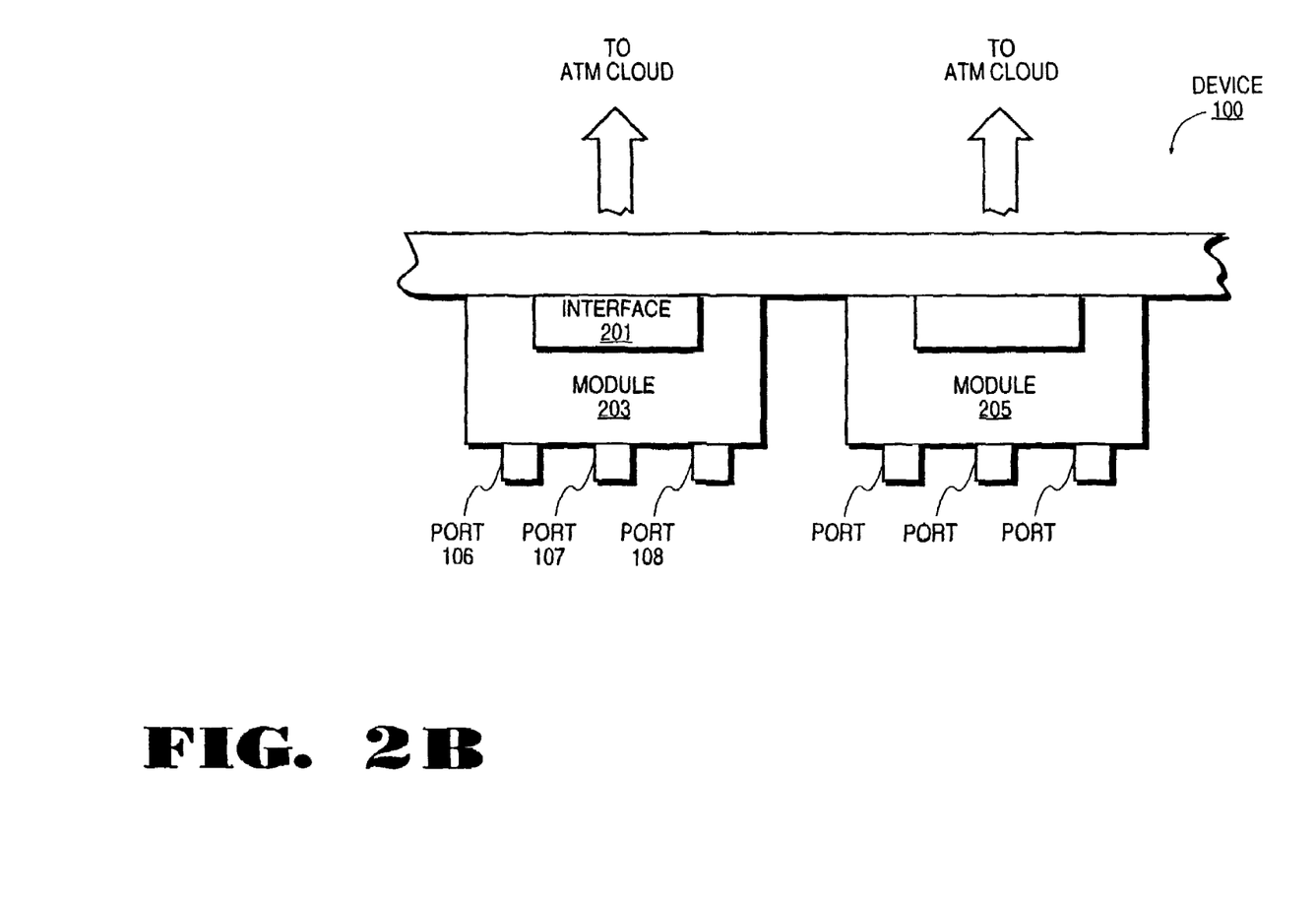
Figure 3:
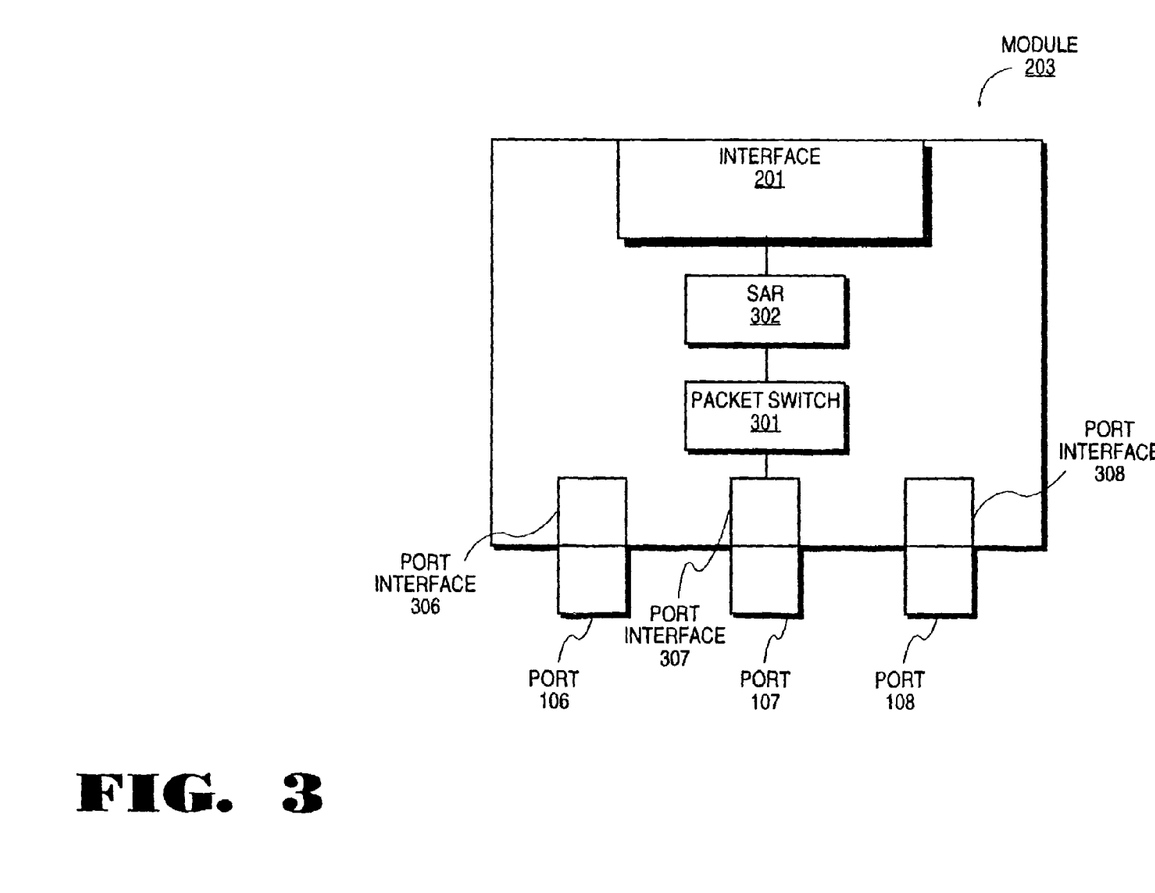
FIG. 3 is a block diagram illustrating components of a device as may be utilized in the present invention.
Figure 4:
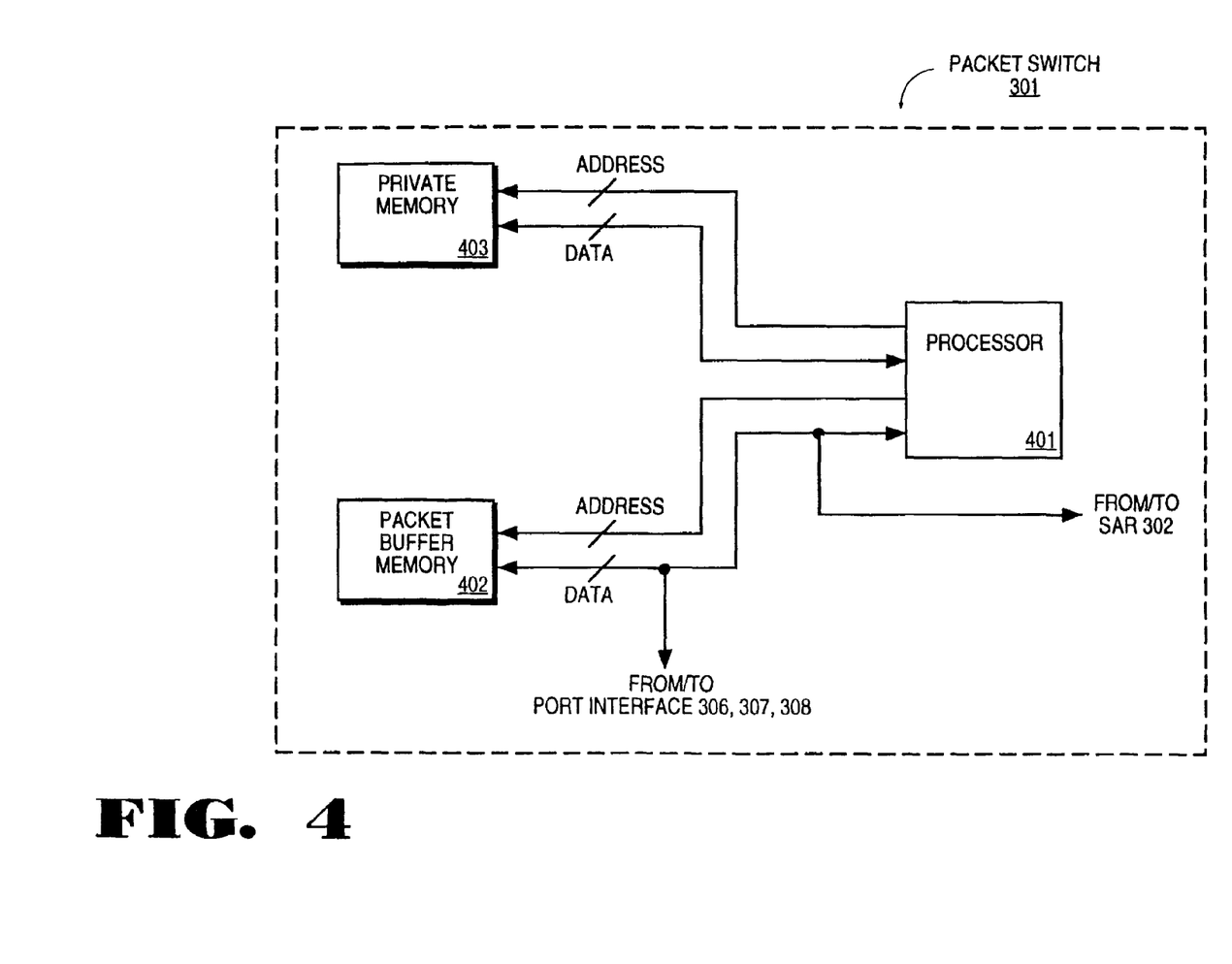
FIG. 4 is a block diagram illustrating a packet switching circuit as may be utilized by the present invention.

FIGS. 2(a) and 2(b) illustrate high level block diagrams of two modes of operation of aspects of the present invention. FIG. 3 provides additional detail of the module 203 illustrated in FIG. 2 and, in particular illustrates the packet switch and segmentation/reassembly circuit utilized in the present invention. Finally, FIG. 4 illustrates additional detail of the packet switch 301.

The ATM-Core LAN Switch

A basic architecture for an ATM-core LAN switch is illustrated in FIG. 2(a). FIG. 2(a) illustrates a device (e.g., ATM-core LAN switch) which comprises a plurality of ports 106-108, an ATM interface 201 and an ATM backplane bus 202 together with module 203. Module 203 will be discussed in greater detail in connection with FIG. 3. The Figure further illustrates a second module 205 coupled with the backplane bus 202. Module 205 may be identical to module 203 (e.g., they may both be token ring modules) or it may be different than module 203 (e.g., module 203 may be a token ring module and module 205 may be an Ethernet module). In any event, for purposes of discussion of the present invention, it is not necessary to distinguish the type of module and aspects of the present invention may apply equally to any number of local area networking technologies.

As discussed above, each of the ports 106-108 support one or more DTEs as illustrated in FIG. 1 and allow for receipt and transmission of data packets from the device 100 to the DTEs. The data packets may be of any of a number of formats such as the formats specified by the IEEE 802.3 (CSMA) or IEEE 802.5 (token ring) standards. These data packets are characterized as being relatively long (when compared with ATM cells) and being of variable length (as compared to fixed length ATM cells). The data packets are sometimes alternatively referred to simply as packets and other times referred to as information packets.

As will be discussed in greater detail below, switching of packets received from a port on module 203 and destined for another port on module 203, is done locally by a data packet switch. Switching of messages between a port on module 203 and a port on module 205 is carried out over ATM backplane bus 202. Packets received on a port on module 203 and destined for a DTE not coupled with device 100 are switched over an ATM network (or ATM cloud) as is better illustrated with reference to FIG. 2(b).

It is noted that in one embodiment of the invention, switching of packets over the ATM backplane 2002 between module 203 and module 205 may be carried out utilizing internal addressing information referred to as destination tag or Dtag information. Use of the Dtag allows the VPI/VCI fields in a cell header to be left unprogrammed removing the overhead of having to determine the appropriate VPI/VCI. Use of Dtags is discussed in greater detail in copending patent application Ser. No. 08/501,483 titled "Method and Apparatus for controlling data flow with a switching device", now U.S. Pat. No. 5,732,080, filed on date even herewith.

The connection allowing for communication between the ports 106-108 and the interface 201 will be described in greater detail with reference to FIG. 3. Interface 201 may be any of a number of conventional interfaces to the ATM communication media such as backplane bus 202.

Although FIG. 2(a) illustrates use of a backplane bus 202 as the ATM-core, it will be apparent that an alternative embodiment may use an ATM switch in place of the bus 202 without departure from the spirit and scope of the present invention.

Destination Tags

In the preferred embodiment, Dtags are twelve bit values. By convention, the four high order bits for Dtags used for point-to-point forwarding are zero. The second four bits in a point-to-point Dtag specify the destination card and the low order four bits specify the destination port on the specified destination card. The Dtags for point-to-point forwarding are pre-allocated upon the initialization of switch device 100. This convention is arbitrary. In some embodiments it may simplify recognition of the direct single port Dtags.

For operations in which data is sent to multiple ports (multi-cast operations), at least one of the first four bits is non-zero. These multi-cast Dtags and their associated table entries are allocated after initialization as needed to represent the virtual architecture of the switching device 100.

An Alternative Embodiment to the ATM-Core

FIG. 2(b) illustrates one alternative to the basic architecture for the ATM-core LAN switch illustrated in FIG. 2(a). In the embodiment of FIG. 2(a), the ATM backplane bus 202 is illustrated at least implicitly as being included as part of device 100. FIG. 2(b) illustrates that the interface 201 may couple the device 100 into communication with an ATM cloud such as a commercial wide area network (WAN). Such a variation should be considered to be within the spirit and scope of the present invention.

The LAN Port Interface, Packet Switch, SAR and ATM Interface

Turning now to FIG. 3, module 203 is illustrated in greater detail. Module 203 comprises the ports 106-108 which are each coupled with a port interface 306-308, respectively. The details of the port interfaces 306-308 are not shown in the drawings but are generally well-known in the art. The port interfaces 306-308 may comprise a commercially available interface with the physical interface (such as a 10BaseT interface), a commercially available MAC (medium access control) circuit which provides for functions such as framing the packets and, optionally, some buffer such as a FIFO buffer providing for buffering the packets as they are received.

Each of the port interfaces 306-308 are coupled with a packet switch The packet switch provides for local switching of data packets. For example, a packet may be received from a DTE coupled to port 106 and may be switched by packet switch 301 to a DTE coupled with port 107. Alternatively, the packet may be destined for a DTE not known to be coupled to any port on the module 203 and, therefore, the packet may be switched by packet switch 301 to SAR 302 for transmission over the ATM-core. Packet switch 301 is illustrated in greater detail in FIG. 4.

The use of packet switch 301 to provide for local switching offers several advantages over a device which provides for switching of all packets over a backplane or other ATM network. For example, assuming that a packet is received from on a local port and is destined for a device on known to be coupled to a local port, use of local switching avoids the any need to segment the packet and reassemble the packet after switching through the ATM network. Further, use of local switching avoids use of bandwidth on the ATM network for local messages.

Packet switch 301 is further coupled with segmentation and reassembly (SAR) circuit 302. Segmentation and reassembly circuits are well-known in the art. For example, various segmentation techniques are described in the '469 patent. Therefore, the particular details of the SAR are not described here in detail. It is sufficient to state the SAR 302 performs the functions of segmenting the variable length data packets into fixed length ATM cells and the function of receiving fixed length ATM cells from the ATM network and reassembling them into data packets for transmission over the ports 306-307.

The SAR 302 is coupled with interface 201 and allows communication of the segmented cells onto the ATM network and allows receipt of cells from the ATM network for reassembly.

The Packet Switch

Packet switch 301 is described in greater detail in FIG. 4. Packet switch 301 comprises a processor 401 coupled with address and data lines to a private memory 403 and to a packet buffer memory 402. The components of the packet switch are relatively conventional and, in fact, packet switches generally are well known in the art. Therefore, the packet switch will not be described in great detail except to note that the general operation of the packet switch is to receive data packets, store them temporarily in the packet buffer memory 402 and then redirect them to the appropriate destination. Private memory 403 stores forwarding tables which indicate to the processor 401 the forwarding address of packets. Essentially, the forwarding tables allow for lookup based on destination address from a packet and provide information to the processor indicating where to switch the packet (e.g., to which port or module).

The forwarding tables are maintained, in one embodiment, using conventional techniques such as used in network bridging where the processor learns what address are coupled with any given port 106-108 based on observing source address received in packets on those ports. The source address/port relationship is then stored in the private memory 403. This method of updating the forwarding tables is sometimes referred to as "positive forwarding".

While it has been stated that the packet switch 301 uses conventional circuits and a conventional method of updating the forwarding tables, as has been described, the present invention advances over the art by allowing use of the packet switch 301 to perform local switching between ports on the module while allowing use of an ATM backplane to allow for switching of packets between modules on the same device and using an ATM network (or ATM cloud) to perform switching between devices. Thus, as illustrated in FIG. 4, packets are transferred into and out of the packet buffer memory 402, under control of processor 401, from port interfaces 306-308 and from the SAR 302. Whenever an destination address of a packet is not found in the forwarding tables stored in private memory 403, the packet is switched to the SAR 302 for forwarding onto the ATM network. Whenever a packet is to be segmented for transmission over the ATM backplane between modules or over the ATM cloud, the packet switch inserts the appropriate VPI/VCI information into the packet header so that the SAR 302 can place the VPI/VCI into each cell that is transmitted.

Maintenance of the Forwarding Tables

As was discussed above, in one embodiment, the forwarding tables are maintained conventionally using positive forwarding.

In another manner of maintaining the forwarding tables, the forwarding tables are updated using a process which will be termed negative forwarding. In this manner of maintaining the forwarding tables, negative forwarding may be used in conjunction with positive forwarding to improve the efficiency of the packet switch 301.

In the described embodiment utilizing negative forwarding, a local port destination table is maintained for each port. The local port destination table maintains a list of addresses of DTEs coupled with the port. In one embodiment of the invention, the local port destination table is maintained by monitoring the "ring poll" or "neighbor notification" protocol on a token ring network in order to determine the addresses of DTEs coupled to the ring attached to the port. As "neighbor notification" or "ring poll" protocol are well-known in the art, such protocols will not be described here in detail.

The local port destination address table may be stored in a content addressable memory or other suitably fast memory device allowing for fast lookup of destination addresses.

Figure 5:
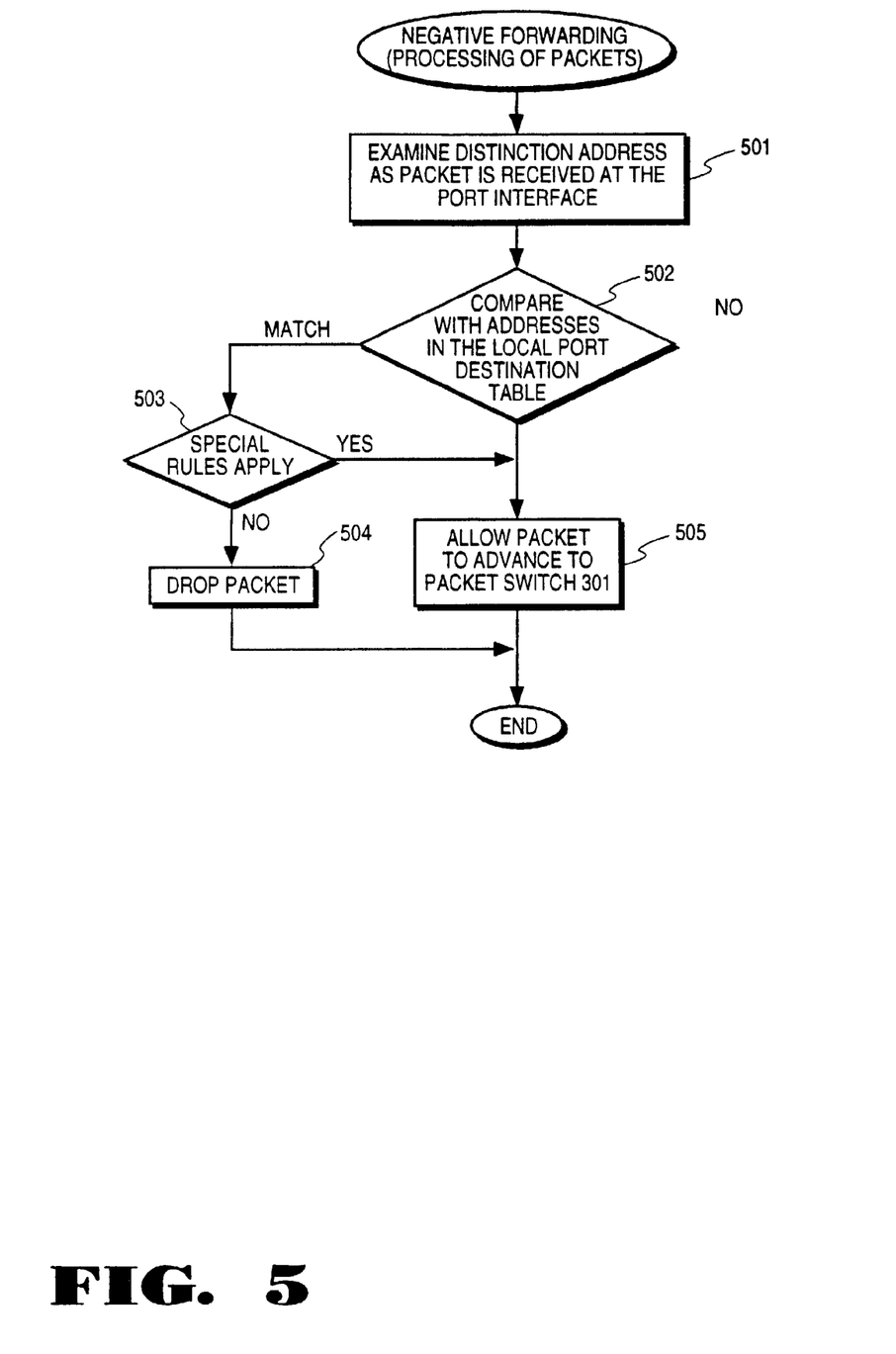
FIG. 5 is a flow diagram illustrates a method of negative forwarding which may be utilized by the present invention.

Turning now to FIG. 5, in the described embodiment, the packet switch 301 is tightly coupled to the port interfaces 306-308 allowing destination addresses to be examined as packets are received, block 501.

The destination address of a packet is compared with addresses in the local port destination address table, block 502. If a match does not occur, the packet is allowed to advance to the packet switch 301 for processing as has been described above, block 505.

However, if a match does occur, a determination is made if any special processing rules apply, block 503. For example, the device 100 may implement certain forwarding rules requiring forwarding of all packets of a certain types. On example is in the case of use of source routing techniques in which explorer packets may need to be forwarded to other segments even though the destination address is known to be local to the port. If special processing rules apply requiring forwarding of the packet, it is forwarded to the packet switch 301, block 505. Otherwise, the packet is dropped (i.e., not forwarded to packet switch 301, block 504.

Importantly, and advantageous to this embodiment of the present invention, use of negative forwarding offers significant advantages—namely, a packet which is local to the port does is not forwarded to switch 301 and, therefore, switch 301 is not burdened with processing the packet.

ALTERNATIVES TO THE PREFERRED EMBODIMENT OF THE PRESENT INVENTION

There are, of course, alternatives to the described embodiment which are within the reach of one of ordinary skill in the relevant art. The present invention is intended to be limited only by the claims presented below.

Thus, what has been disclosed is a method and apparatus which provides for local packet switching, local ATM switching and non-local ATM switching.

What is claimed is:

1. A first module implemented within a switch along with at least a second module and a backplane coupling the first and second modules, the first module comprising:
    a first port to receive a packet; and
    a packet switch coupled to the first port, the packet switch to provide for local switching of the packet utilizing a local port destination table and a destination tag, the local port destination table containing addresses of equipment attached to the first port and being maintained by negative forwarding, the destination tag comprising a multicast field to indicate at least two ports on the first and second modules to receive the packet.

2. The first module of claim 1 further comprising a segmentation and reassembly (SAR) circuit coupled to the packet switch.

3. The first module of claim 1, wherein the first port includes a port interface, the port interface being coupled to the packet switch.

4. The first module of claim 3, wherein the port interface is a Medium Access Control (MAC) circuit.

5. The first module of claim 3, wherein the port interface is an Ethernet interface circuit.

6. The first module of claim 1, wherein when the packet switch determines that a second port on the second module being implemented within the switch is targeted to receive the packet, the packet switch utilizes the destination tag for routing of the packet to the second module over the backplane.

7. The first module of claim 1, wherein the destination tag utilized by the packet switch further comprises a port field.

8. The first module of claim 7, wherein the port field of the destination tag is used to specify a destination port for the packet when the multicast field is set to a first value in order to support a point-to-point transmission of the packet to the destination port.

9. The first module of claim 8, wherein the first value is a result in which each bit of the multicast field of the destination tag is zero.

10. The first module of claim 8, wherein the first value is a result in which each bit of the multicast field of the destination tag has a same value.

11. The first module of claim 8, wherein the bits associated with the port field are used for multicast operations when the multicast field is set to a second value differing from the first value.

12. The first value of claim 11, wherein the second value includes at least one bit of the multicast field being non-zero.

13. The first module of claim 1 being adapted for coupling to the backplane being an Asynchronous Transfer Mode (ATM) backplane.

14. A first module implemented within a switch adapted for coupling to a backplane and a second module, the first module comprising:
    a port; and
    a packet switch coupled to the port, the packet switch to provide for local switching of a packet by utilizing a local port destination table and a destination tag, the local port destination table containing addresses of equipment attached to the port and being maintained by negative forwarding, the destination tag comprising (i) a multicast field to indicate ports associated with the first, and second modules to receive a packet when the packet switch is supporting multicast routing of the packet and (ii) a port field to specify a destination port to receive the packet when the packet switch is supporting point-to-point forwarding of the packet.

15. The first module of claim 14 further comprising a segmentation and reassembly (SAR) circuit coupled to the packet switch.

16. The first module of claim 14, wherein the port includes a port interface, the port interface being coupled to the packet switch.

17. The first module of claim 16, wherein the port interface is a Medium Access Control (MAC) circuit.

18. The first module of claim 16, wherein the port interface is an Ethernet interface circuit.

19. The first module of claim 14, wherein the packet undergoes the multicast routing in lieu of the point-to-point forwarding when the multicast field of the destination tag is set to a first predetermined value.

20. The first module of claim 19, wherein the first predetermined value is equal to a value in which at least one bit of the multicast field of the destination tag is non-zero.

21. The first module of claim 14, wherein the packet undergoes point-to-point forwarding to the destination port when to the multicast field of the destination tag is set to a first predetermined value.

22. The first module of claim 21, wherein the first predetermined value includes each bit of the multicast field of the destination tag being zero.

23. the first module of claim 21, wherein the first predetermined value includes each bit of the multicast field of the destination tag being set to a same logic level.

24. A method of routing a packet, the method comprising:
    maintaining a local port destination table containing addresses of equipment attached to a port in a first module using negative forwarding;
    retrieving a packet including a destination address on the port of the first module;
    if the destination address does not match the addresses in the local port destination table, using the destination address by the first module to determine whether the packet is to be routed to a second module over a backplane, and utilizing a destination tag instead of the destination address for routing the packet over the backplane from the first module to the second module, the destination tag being used to support either multicast routing of the packet or point-to-point forwarding of the packet.

25. The method of claim 24, wherein the destination tag comprises a first field to specify ports associated with the first and second modules to receive the packet during the multicast operations and a second field to specify a destination port to receive the packet during the point-to-point forwarding when the first field is set to a specified value.

26. The method of claim 25, wherein the specified value of the first field is equal to a result when all bits of the first field are zero.

27. The method of claim 25, wherein the specified value is equal to a result when all bits of the first field are the same.

28. The method of claim 25, wherein the packet is routed to a grouping including the ports when the first field of the destination tag is set to a value different than the specified value.

29. The method of claim 28, wherein the value is equal to a result when any bit of the first field is non-zero.

30. The first module of claim 1 wherein the packet switch forwards the packet to another segment if a destination address of the packet matches with one of the addresses in the local port destination address table and a forwarding special rule applies.

31. The first module of claim 1 wherein the packet switch does not forward the packet if a destination address of the packet matches with one of the addresses in the local port destination address table and none of forwarding special rule applies.

32. The first module of claim 14 wherein the packet switch forwards the packet to another segment if a destination address of the packet matches one of the addresses in the local port destination address table and a forwarding special rule applies.

33. The first module of claim 14 wherein the packet switch does not forward the packet if a destination address of the packet matches one of the addresses in the local port destination address table and none of forwarding special rule applies.

34. The method of claim 24 further comprising:
if the destination address matches one of the addresses in the local port destination address table and a forwarding special rule applies, forwarding the packet to another segment according to the forwarding special rule.

35. The method of claim 24 further comprising:
if the destination address matches one of the addresses in the local port destination address table and none of forwarding special rules applies, not forwarding the packet.

* * * * *